March 15, 1966 J. M. AMMERMAN ETAL 3,240,985

MAGNETIC SHIELD FOR A COLOR PICTURE TUBE

Filed July 18, 1962

2 Sheets-Sheet 1

INVENTORS
JOHN M. AMMERMAN &
PHILIP G. McCABE

BY W. H. Spongle
ATTORNEY

INVENTORS
JOHN M. AMMERMAN &
PHILIP G. McCABE
BY
W. H. Sponagle
ATTORNEY

United States Patent Office 3,240,985
Patented Mar. 15, 1966

3,240,985
MAGNETIC SHIELD FOR A COLOR PICTURE TUBE

John M. Ammerman and Philip G. McCabe, Indianapolis, Ind., assignors to Radio Corporation of America, a corporation of Delaware Filed July 18, 1962, Ser. No. 210,748
4 Claims. (Cl. 315—8)

This invention relates to a magnetic shield for color picture or cathode ray tubes.

In producing a color television picture, a three-beam picture tube may be provided having a viewing screen comprising a plurality of triads of phosphor dots. Each beam is converged on its respective dot of the triad thereof during the scanning of the viewing screen and each dot of the triad produces its characteristic color upon being hit by an electron beam, whereby a color picture is produced on the viewing screen. If the beams are unduly shifted, as by a magnetic field which is independent of the deflecting fields produced in the normal operation of a television receiver, the beams may hit the wrong phosphor dots of the triads thereof, or they may hit a portion of the faceplate of the picture tube that has no phosphor thereon. In such cases, the wrong color of picture or a dim picture may be produced. A magnetic field that may affect the picture of a color television receiver, particularly when the axis of the color picture tube extends in an east-west direction, is the earth's magnetic field. Known shields for reducing or counteracting the effect of the earth's magnetic field on the beams of a three-beam color picture tube are of magnetic material, usually spun to fit the bell of the picture tube. Such shields are heavy and expensive to make and to mount.

It is therefore, an object of this invention to provide an improved apparatus for reducing the shifting effect on a beam of a cathode ray tube by the earth's magnetic field.

It is an object of the invention to provide an improved apparatus for reducing the shifting effect on the beam or beams of a color picture tube by the earth's magnetic field.

This invention comprises a sheet of magnetic material, such as a sheet of iron, having a hole therethrough of a size to receive a portion of the bell of a cathode ray tube, and means to hold the sheet in a position surrounding a portion of the bell of the cathode ray tube and substantially at right angles to the axis of the cathode ray tube.

This invention is more fully explained in the following detailed description thereof taken with the accompanying drawings in which.

Figure 1:
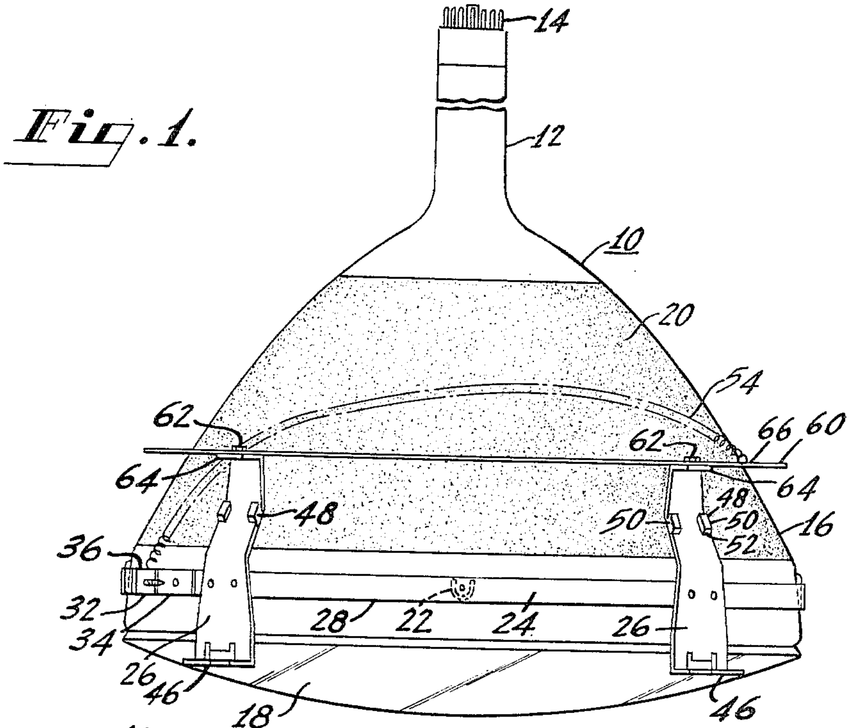
FIG. 1 is a top view of a structure embodying the invention and in which a magnetic shield is supported on a color picture tube.
Figure 2:
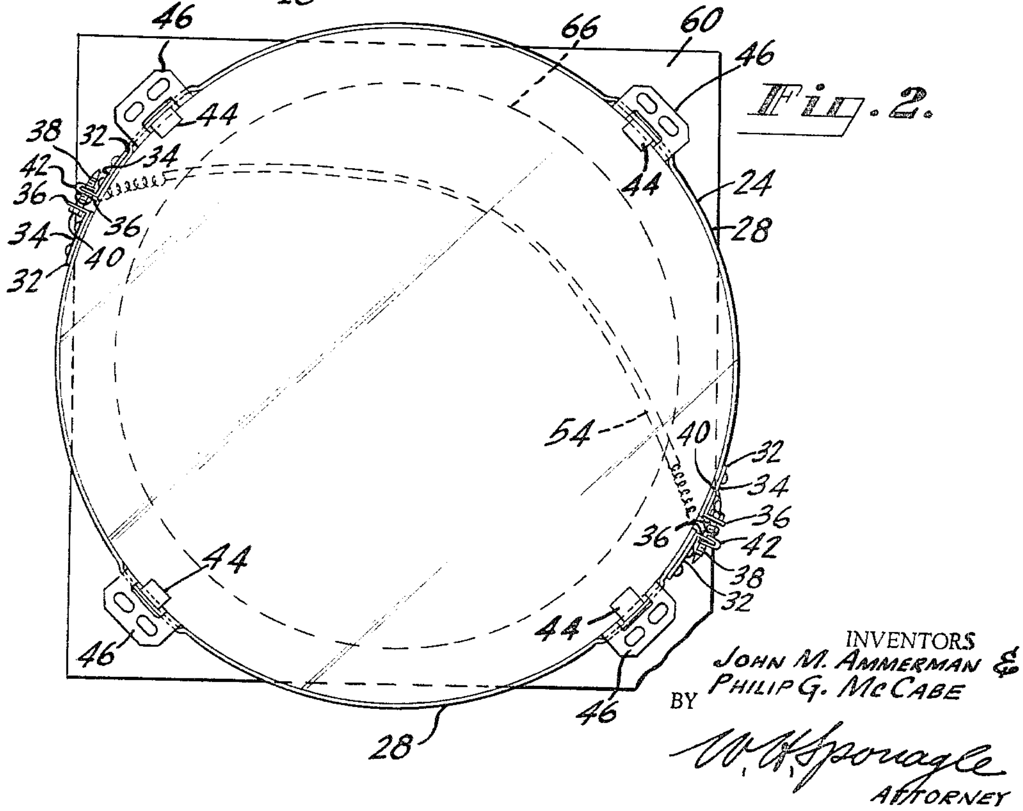
FIG. 2 is a front view of the structure of FIG. 1.

Turning to FIGS. 1 and 2, a known three-beam color picture tube 10 is illustrated. This tube includes a neck portion 12 having base pins 14 extending from one end thereof, a bell portion 16 and a faceplate 18. A conductive coating 20 is applied externally of the tube on the bell portion thereof, and a pair of U-shaped projections 22 (only one of which is shown) are embossed at diametrically opposite points on the bell of the tube near the forward or faceplate end of the bell, The tube is supported on a conductive facemask (not shown) by a strap means 24 and a bracket means 26. The strap means 24 surrounds the bell 16 at the U-shaped projections 22 thereon.

The strap means 24 comprises two identical strap portions 28, 28 each having an angle iron 32 fixed to each end of the strap portion 28. The angle irons 32 have two legs 34 and 36 integrally joined together at right angles to each other. One leg 34 of each angle iron 32 is riveted to an end of a strap portion 28, the other leg 36 of the angle iron 32 extending laterally of the strap portion 28 at an end thereof. The strap portions 28 are fixed together and tightened about the picture tube 10 by screws 38 extending through holes in the adjacent laterally extending legs 36 of the angle irons, the heads 40 of the screws 38 each contacting a face of its corresponding leg 36. To provide means for engaging the threads of the screws 38 with the laterally extending legs 36 of the adjacent angle iron 32, a sheet steel nut 42 may be provided on the adjacent angle iron leg 36.

The tube support comprises the above-described strap means 24 and a plurality of brackets 26, here shown as four in number, extending at right angles, and riveted, to the strap means 24 at positions separated at about 90° around the periphery of the picture tube 10 to be supported. Each bracket 26 conforms generally to the shape of the bell 16 of the picture tube 10 and has a front clip 44 extending radially inwardly in contact with the adjacent edge portion of the face plate 18. Each bracket 26 also includes a radially outwardly extending flange portion 46 to be fixed in any suitable manner to a metallic non-magnetic facemask (not shown). While the outwardly extending flanges 46 are shown as being positioned forward of the inwardly extending clips 44, it will be understood that the flanges 46 may extend from the brackets 26 in any convenient position along the length thereof, for fixing the flanges 46 to the facemask. A rubber pad 48 may be fitted between the bell 16 of the tube 10 and the rearwardly extending portion of each bracket 26 for cushioning the tube 10 with respect to the bracket 26. This pad 48 may have ears 50 extending into notches 52 cut in the bracket 26, to hold the pad 48 in position with respect to the bracket 26.

To provide grounding of the external coating 20 on the picture tube 10, a metallic spring 54 is provided. This spring 54, which is connected under sufficient tension between the two screws 38 to make a good connection with the coating 20, lies on the coating 20, whereby the coating is electrically connected to the strap means 24. The brackets 26, which are electrically connected to the strap 24 means completes the electrical connection of the coating 20 to the metallic facemask (not shown), which may itself be grounded.

The magnetic shield 60, to be described, is mounted in a position surrounding the bell 16 of the picture tube 10 and is supported, as by screws 62 on radially outwardly extending flanges 64 integrally formed with the rear ends of the brackets 26.

The magnetic shield 60 may comprise a sheet of metallic material, such as iron, of generally square shape, having a side of a length a little less than the diameter of the faceplate 18 of the picture tube 10 and having a hole 66 therethrough large enough to surround the bell portion 16 of the picture tube 10 at the adjusted position of the shield 60 with respect thereto, without touching either the bell portion 16 of the tube 10 or the grounding spring 54, as more fully noted below. As shown in FIGS. 1 and 2, the shield 60 may be of one piece, square in shape, and having a round hole 66 therethrough. The shield 60, however, may take any generally annular disk shape.

Figure 3:
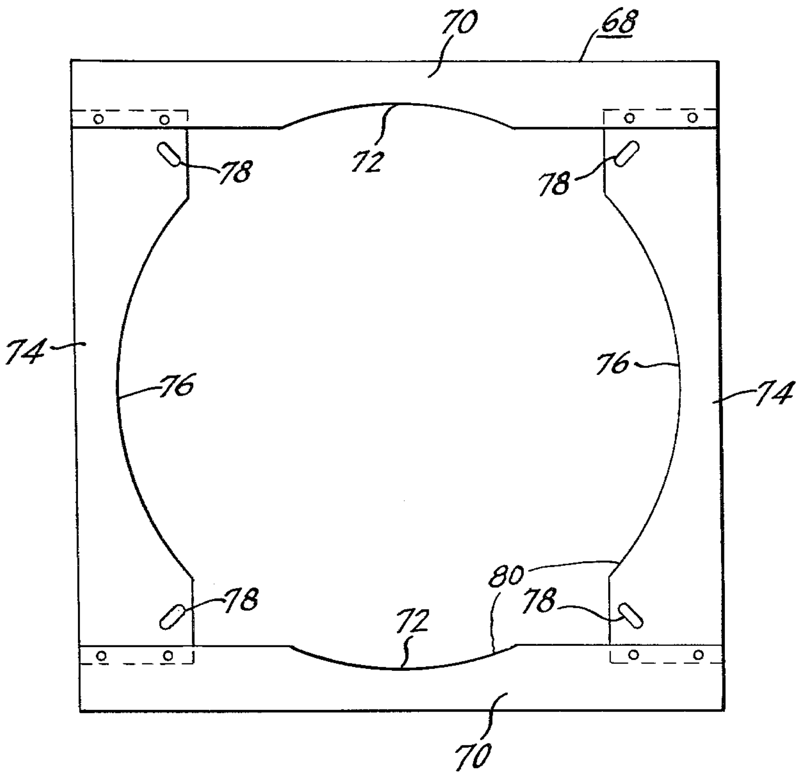
FIG. 3 is a plan view of a shield constructed of a plurality of pieces of sheet metal which may be used for the shield of FIG. 1.

To save material, the shield 60 may be made of several pieces of sheet material fixed together in a known manner and formed from pieces cut from sheets of iron or steel in such a pattern as to minimize waste. A shield 68 constructed of four pieces of sheet steel is shown in FIG. 3. The upper and lower pieces (as viewed in FIG. 3) of sheet steel 70, 70 in this showing, are identical and are of generally rectangular shape and of a length equal to the side dimension of the completed shield 68. An arcuate portion 72 is cut out, centrally of a side edge, of the upper and lower pieces 70. The right and left-hand pieces 74, 74 as viewed in FIG. 3, are also identical with each other. These pieces 74 are of generally rectangular shape, being shorter and wider, however, than the upper and lower pieces. A larger, arcuate portion 76 is cut out centrally of one side edge of the right and left-hand pieces 74. Mounting slots 78 are provided, two in each of the right and left-hand pieces 74, near the edges thereof adjacent the arcuate cuts, to receive the screws 62 for fastening the shield to the mounting flanges 64. The four pieces 70, 70, 74 and 74 are fixed together by rivets, with the arcuate cutouts so arranged as to be directly inwardly, to provide a generally square shield structure or assembly or unitary piece of magnetic material having a generally circular hole therethrough, expanded, however, at four positions 90° apart around the circumference thereof.

A convenient thickness of magnetic material is chosen for the shield 60 or 68. The shielding properties of the shield becomes better as the thickness of the shield is increased; however, as thickness is increased, the shield soon becomes too heavy to handle and to support conveniently. Also, the closer the internal diameter of the hole 66 or 80 fits the bell 16 of the tube 10, the better the shielding; however, the internal diameter of the hole through the shield is conveniently made large enough to clear the conductive coating 20 and the grounding spring 54. Similarly, the greater the dimensions of the shield, the better the shielding structure operates, but for convenience, the maximum dimensions of the shield are influenced, if not determined, by convenience of mounting the picture tube, and the shield, in a cabinet. The position of the shield along the axis of the picture tube is "tunable" in the sense that optimum magnetic shielding is produced at a certain position along the bell of the tube and the shielding effect is less in any position in either direction away from the optimum position. While the shield is shown and described as being perpendicular to the axis of the picture tube, small variation from the normal does not unduly lessen the shielding effect. The presence or absence of the non-magnetic metal maskplate (not shown) does not noticeably affect the operation of the magnetic shield.

While the operation of this shield is not presently fully understood, it is thought that the earth's magnetic field in the vicinity of the shield passes more readily through the shield than through the bell of the tube, thereby rarefying the magnetic lines of force within the tube and reducing the effect of the earth's magnetic field on the electron beams of the tube. Or, a field may be induced in the shield which tends to counteract the magnetic field of the earth on the beams of the picture tube.

In one practical installation of such a magnetic shield on a 21 inch picture tube, such as an RCA Type 21FJP22, the square shield is supported about 6¼ inches back of the forward peripheral edge of the faceplate, the shield is made of sheet steel about .050 of an inch thick having a hole of about 17¾ inches diameter and having an edge dimension of about 20 inches.

What is claimed is:

1. The combination of a cathode ray picture tube and a magnetic shielding means therefor,
   said shielding means consisting only of a generally planar sheet of magnetic material having a hole therethrough of a size to receive the bell of said picture tube,
   said sheet surrounding the bell portion of said tube, and
   the axis of said picture tube being substantially at right angles to said generally planar sheet.

2. The combination of a cathode ray picture tube and a magnetic shielding means therefor,
   said shielding means consisting only of a generally flat structure of magnetic material having a centrally located hole therethrough,
   the bell of said picture tube extending through said hole, and
   the axis of said picture tube being substantially at right angles to the plane of said generally flat structure.

3. The combination of a cathode ray picture tube and a magnetic shielding means therefor,
   said shielding means consisting only of a generally flat arrangement of magnetic material having a hole therethrough,
   the bell of said picture tube extending through said hole, and
   the axis of said picture tube being substantially at right angles to the plane of said generally flat arrangement.

4. The combination of a cathode ray picture tube and a magnetic shielding means therefor,
   said shielding means consisting only of a generally flat unitary piece of magnetic material having a centrally located hole therethrough,
   the bell of said picture tube extending through said hole, and
   the axis of said picture tube being substantially at right angles to said generally flat unitary piece of material.

References Cited by the Examiner

UNITED STATES PATENTS 2,898,509 8/1959 Clay et al. ............ 315—8

GEORGE N. WESTBY, *Primary Examiner.*